(12) United States Patent
Evans

(10) Patent No.: US 6,698,284 B1
(45) Date of Patent: Mar. 2, 2004

(54) LIQUID LEVEL GAUGE

(76) Inventor: Robert W. Evans, 2004 N. Vancouver Ave., Portland, OR (US) 97227

(*) Notice: Subject to any disclaimer, the term of this patent is extended or adjusted under 35 U.S.C. 154(b) by 0 days.

(21) Appl. No.: 10/244,176

(22) Filed: Sep. 16, 2002

(51) Int. Cl.[7] .............................................. G01F 23/02
(52) U.S. Cl. ....................... 73/323; 73/290 R; 73/325; 73/326
(58) Field of Search ............................... 73/290 R, 323, 73/325, 326

(56) References Cited

U.S. PATENT DOCUMENTS

| | | | |
|---|---|---|---|
| 4,693,117 A | * | 9/1987 | Mills ........................... 73/326 |
| 5,052,224 A | * | 10/1991 | Ford et al. ..................... 73/325 |
| 6,234,018 B1 | * | 5/2001 | Kelada ......................... 73/323 |

* cited by examiner

Primary Examiner—Hezron Williams
Assistant Examiner—Rodney Frank
(74) Attorney, Agent, or Firm—James D. Givnan, Jr.

(57) ABSTRACT

A gauge includes a translucent tube assembly having metallic tubular end segments. The end segments are endwise embedded within the ends of the translucent tube and permit dispensing with packing when joined to shut off valves at the ends of the tube assembly. The shut off valves are in communication with vertically spaced apart ports in a liquid storage tank. Liquid level in the tube assembly corresponds to the level liquid in the storage tank.

4 Claims, 2 Drawing Sheets

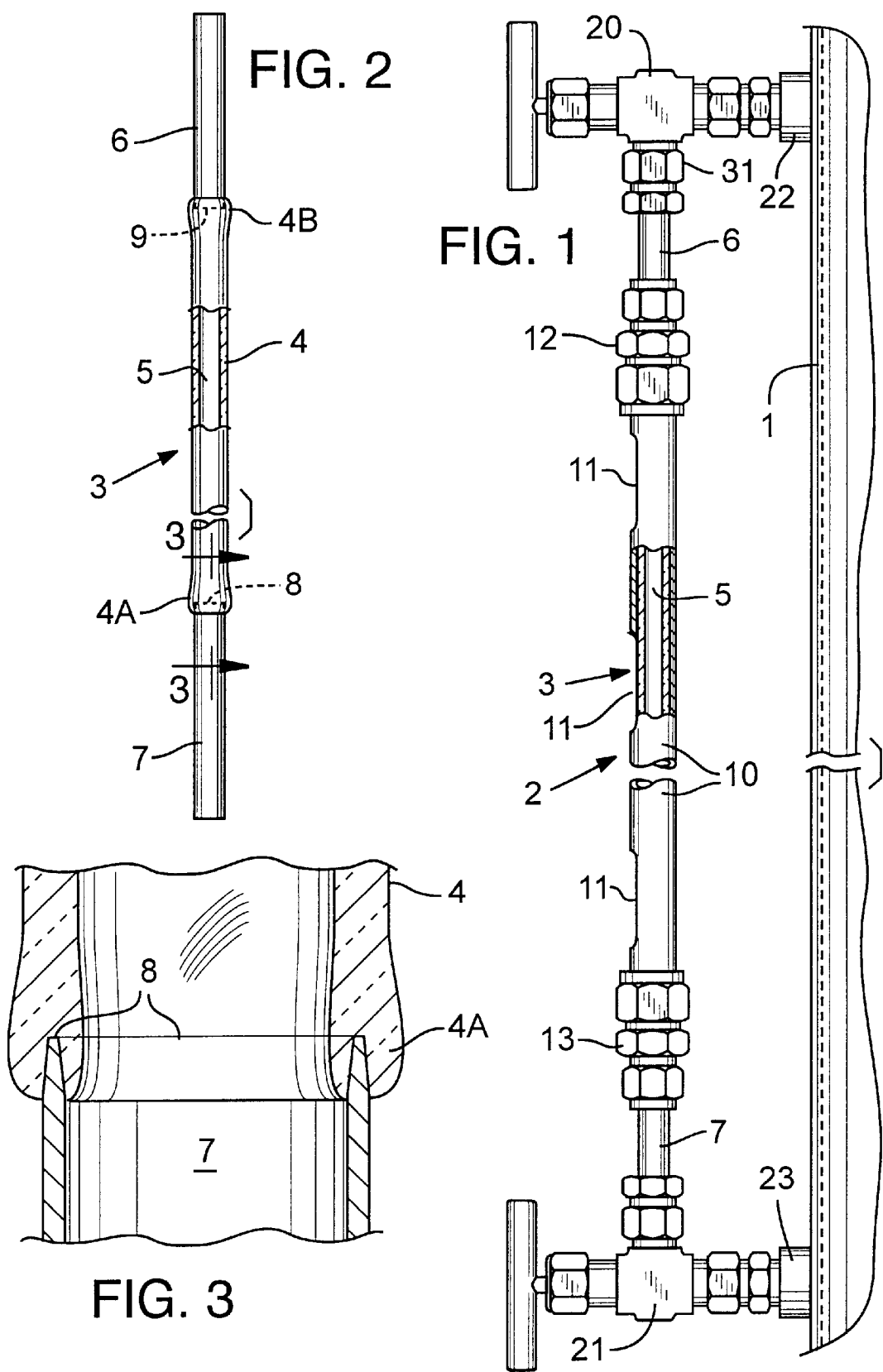

LIQUID LEVEL GAUGE

BACKGROUND OF THE INVENTION

The present invention pertains to gauges normally installed on the side of an industrial storage tank for liquids to provide a visual indication of the liquid level in the storage tank.

Generally such gauges, in current use, utilize a length of glass tubing, or the like, in communication at its top and bottom ends with shut off valves in place on a tank wall. With the valves open, liquid level in the glass tank corresponds to the level of tank contents.

The glass tube is usually several inches in length, which renders the gauge susceptible to breakage upon being accidentally struck by other equipment or by forceful streams of water or steam during a cleaning operation. Attempts to shield the glass tubing include metal rods laterally offset from the gauge. Such rods only partially shield the tube to avoid obscuring same.

A common problem with such gauges results from reliance on packing at the tube ends at the valve connection. If the packing is over compressed during tightening of the gauge fittings the tube end may shatter while if not adequately tightened or compressed, the packing may leak.

Replacement of damaged sight gauges is a time consuming and costly operation and in some installations may require emptying of the associated storage tank or at least lowering of tank level. Loss of tank fluid from a broken liquid level gauge can result in damage to a plant and, depending on the liquid, costly environmental consequences from the resulting spill.

SUMMARY OF THE PRESENT INVENTION

The present invention is embodied in a gauge for installation on a liquid storage tank with the gauge having a translucent tube assembly with metallic end segments.

The end segments are not susceptible to damage from accidental over-tightening and hence attachment to an associated valve may be in a tight manner obviating leakage.

The end segments of the tube assembly are secured to the translucent glass tube during manufacture of the tube assembly. The glass or translucent component of the present gauge is protected by a housing able to withstand random impacts from equipment such as that used in industrial sites.

Important objectives of the present gauge include the provision of a translucent sight gauge having a tube assembly with non-breakable end segments capable of withstanding substantial compression forces to the extent packing to seal the tube ends may be dispensed with; the provision of a gauge which may be several feet in length and fully protected by a housing along its length; the provision of a liquid level gauge allowing replacement of the translucent tube assembly by dispensing with packing about the tube ends; the provision of a liquid level gauge having a metal housing in place about a translucent tube assembly with the housing having couplings at each end engaging metal end segments of the translucent tube assembly in a secure packing free manner without risk of damage to the tube assembly and without reliance on packing.

BRIEF DESCRIPTION OF THE DRAWINGS

In the accompanying drawings:

FIG. 1 is a fragmentary side elevational view of a liquid storage tank with the present liquid level gauge in place on a tank wall;

FIG. 2 is an elevational view of a tube assembly of the present liquid level gauge;

FIG. 3 is an enlarged fragmentary elevational view taken along line 3—3 of FIG. 2;

DETAILED DESCRIPTION OF THE PREFERRED EMBODIMENTS

Figure 5:
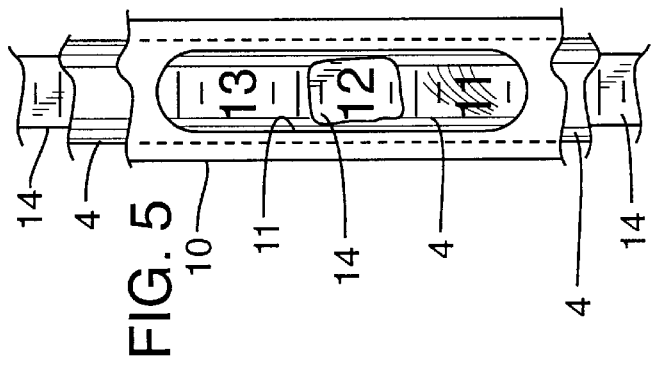
FIG. 5 is a fragmentary view of a segment of the tube assembly.
Figure 4:
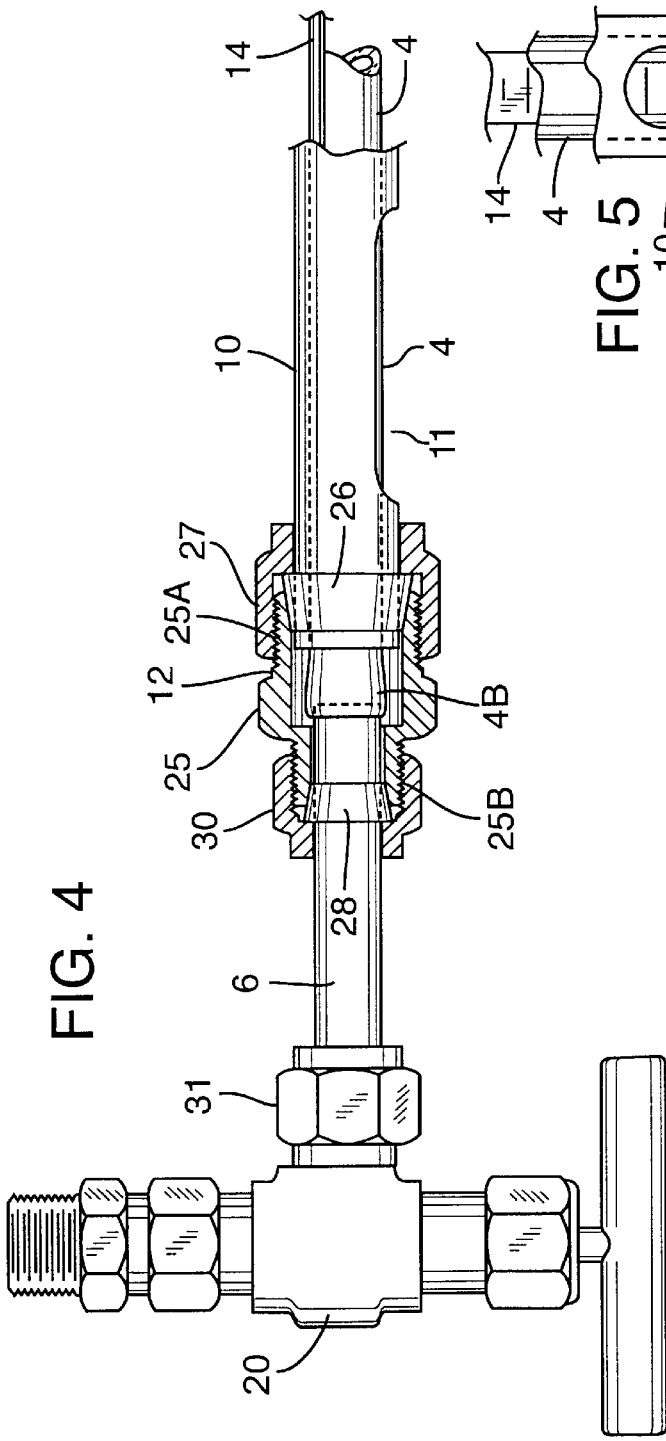
FIG. 4 is an enlarged fragmentary view of the uppermost portion of FIG. 1.
Figure 6:
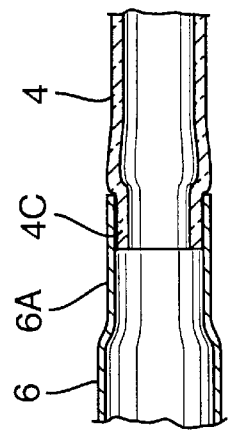
FIG. 6 is a sectional view of a modified form of the tube assembly.

With continuing attention to the drawings wherein applied reference numerals indicate parts similarly hereinafter identified, the reference numeral 1 indicates a liquid storage tank which may be of the type used at industrial sites such as in a boiler power plant.

Indicated generally at 2 is the present liquid level gauge shown offset from tank 1 and in communication with the tank interior for the purpose of receiving tank contents for determining the level of the liquid within the tank.

Disposed interiorly of the gauge at 2 is a tube assembly or structure indicated generally at 3 which includes a major segment of glass tubing 4. The tube interior is at 5 in communication with the interior of upper and lower metal tube segments at 6 and 7 of the tube assembly. A metal to glass transition area is depicted in FIG. 3 with the following description also applicable to the securement of the remaining metal tube segment to the other end of glass tube 4.

Permanent joining of glass tubing with metal tubing is a technique utilized by the CAJON Company, a subsidiary of the SWAGELOK Corporation. The words SWAGELOK and CAJON are registered trademarks of the SWAGELOK Corporation.

A suitable tube assembly 3 of the present gauge utilizes tube segments 6 and 7 of stainless steel while glass component 4 of the assembly may be 7740 PYREX, a registered trademark of Corning Glass. Upon completion of tube assembly 3 it will be noted that an end 8 of metal end segment 7 is embedded within a heated end segment 4A of glass tube 4. Similarly an end segment 4B of glass tube 4 receives the embedded end 9 of metal end segment 6. The metal end segments may be of 304 stainless steel.

A housing at 10 extends lengthwise of and protects tube assembly 3. Elongate open areas 11 are spaced along the housing to permit viewing of glass tube 4 to determine liquid level therein. Suitably affixed within housing 10 and coextensive therewith is a measure at 14 having markings 15 visible through openings 11 which correspond to a range of tank fluid levels to facilitate calculation of tank quantity.

Reducing units at 12 and 13 attach respectively the upper and lower ends of protective housing 10 to metal tube segments 6 and 7.

Shut-off valves 20 and 21 each receive respectively the upper end of metal tube segment 6 and the lower end of metal segment 7 with each shut-off valve in engagement with a tank mounted fitting at 22 and 23. Reducing units 12 and 13 serve to lock housing 10 in place on the tube assembly and prevent displacement of the housing 10 relative glass tube assembly 3.

Reducing units at 12 and 13 couple housing 10 to tube segments 6 and 7. Each unit typically includes a coupler 25 having a threaded end 25A drawn by a nut 27 into seated engagement with a tapered collar 26. A remaining end 25B of coupler 25 seats against a tapered collar 28 pressed on a metal end segment 6 (or 7) by rotation of a nut 30 onto end 25B of the coupler. A nut 31 attaches metal tube segment 6 to valve 20 (or 21) using similar pipe fittings.

A modified form of securement of an end 4C of glass tube 4 to a metal tubular segment 6 (or 7) may entail the insertion of the glass tube end into the segment 6 (or 7) with the segment thereafter reduced in diameter at 6A to close about inserted end 4C of glass tube 4.

The term "housekeeper seal" is used in the tube fabricating art to identify fluid tight connections of coaxially joined metal and glass tubes.

In the tube making art per se, the transition form glass tubing to metal tubing is a known technique.

While I have shown but a few embodiments of the invention, it will be apparent to those skilled in the art that the invention may be embodied still otherwise without departing from the spirit and scope of the claimed invention.

Having thus described the invention, what is desired to be secured by a Letters Patent is:

I claim:

1. In a liquid level gauge of the type for installation on a storage tank and having a tubular structure for reception of a fluid from the tank, valves at the ends of the tubular structure for communication with the interior of the storage tank, the improvement comprising, said tubular structure comprising a tube of translucent material, metal tubes each having an end segment in fluid tight packing free engagement with the opposite ends of the tube of translucent material, each of said metal tubes having a second end segment terminating in attachment respectively to one of said valves.

2. The improvement claimed in claim 1 wherein said housing and said tube of translucent material are cylindrical and concentric.

3. The improvement claimed in claim 1 wherein the end segment of each of said metal tubes is embedded respectively within one of said opposite ends of the tube of translucent material.

4. The improvement claimed in claim 1 wherein the opposite ends of the tube of translucent material are of reduced diameter relative tube diameter, the end segment of each of said metal tubes is of reduced diameter relative the diameter of their respective metal tubes to overlie the opposite ends of the tube.

* * * * *